US006533932B1

(12) United States Patent
Kallberg et al.

(10) Patent No.: US 6,533,932 B1
(45) Date of Patent: Mar. 18, 2003

(54) DEVICE FOR THE CONTINUOUS FURTHER TRANSPORT OF AIR

(75) Inventors: Tommy Kallberg, Molndal (SE); Stig Hjalmarsson, Onsala (SE)

(73) Assignee: AB Volvo Penta, Gothenburg (SE)

( * ) Notice: Subject to any disclaimer, the term of this patent is extended or adjusted under 35 U.S.C. 154(b) by 0 days.

(21) Appl. No.: 09/857,790

(22) PCT Filed: Dec. 1, 1999

(86) PCT No.: PCT/SE99/02243

§ 371 (c)(1),
(2), (4) Date: Aug. 22, 2001

(87) PCT Pub. No.: WO00/36290

PCT Pub. Date: Jun. 22, 2000

(30) Foreign Application Priority Data

Dec. 11, 1998 (SE) .............................................. 9804297

(51) Int. Cl.[7] ......................... B01D 27/00; B01D 35/02; B01D 39/00; F02M 37/20

(52) U.S. Cl. .................... 210/232; 210/416.4; 210/436; 210/438; 210/472

(58) Field of Search ................................. 210/232, 349, 210/416.1, 416.4, 436, 438, 472; 55/385.3, 385.4

(56) References Cited

U.S. PATENT DOCUMENTS

| | | | | | |
|---|---|---|---|---|---|
| 3,239,064 | A | * | 3/1966 | White | 210/436 |
| 5,284,585 | A | * | 2/1994 | Paquet et al. | 210/436 |
| 5,382,361 | A | * | 1/1995 | Brun | 210/436 |
| 5,520,156 | A | | 5/1996 | Brunnhofer | |
| 5,584,988 | A | * | 12/1996 | Hashimoto et al. | 210/136 |

FOREIGN PATENT DOCUMENTS

| | | |
|---|---|---|
| EP | 0 300 910 | 1/1989 |
| FR | 804 571 | 10/1936 |
| FR | 2 623 251 | 5/1989 |

* cited by examiner

*Primary Examiner*—Fred Prince
(74) *Attorney, Agent, or Firm*—Young & Thompson

(57) ABSTRACT

A device for the continuous further transport of air in a fuel system includes a container with an inlet orifice and an outlet orifice for the fuel. A tube provided in the container extends from the outlet orifice and opens into a collection space for air in the container. The invention also relates to a replaceable unit for such a device.

9 Claims, 1 Drawing Sheet

DEVICE FOR THE CONTINUOUS FURTHER TRANSPORT OF AIR

Figure 1:
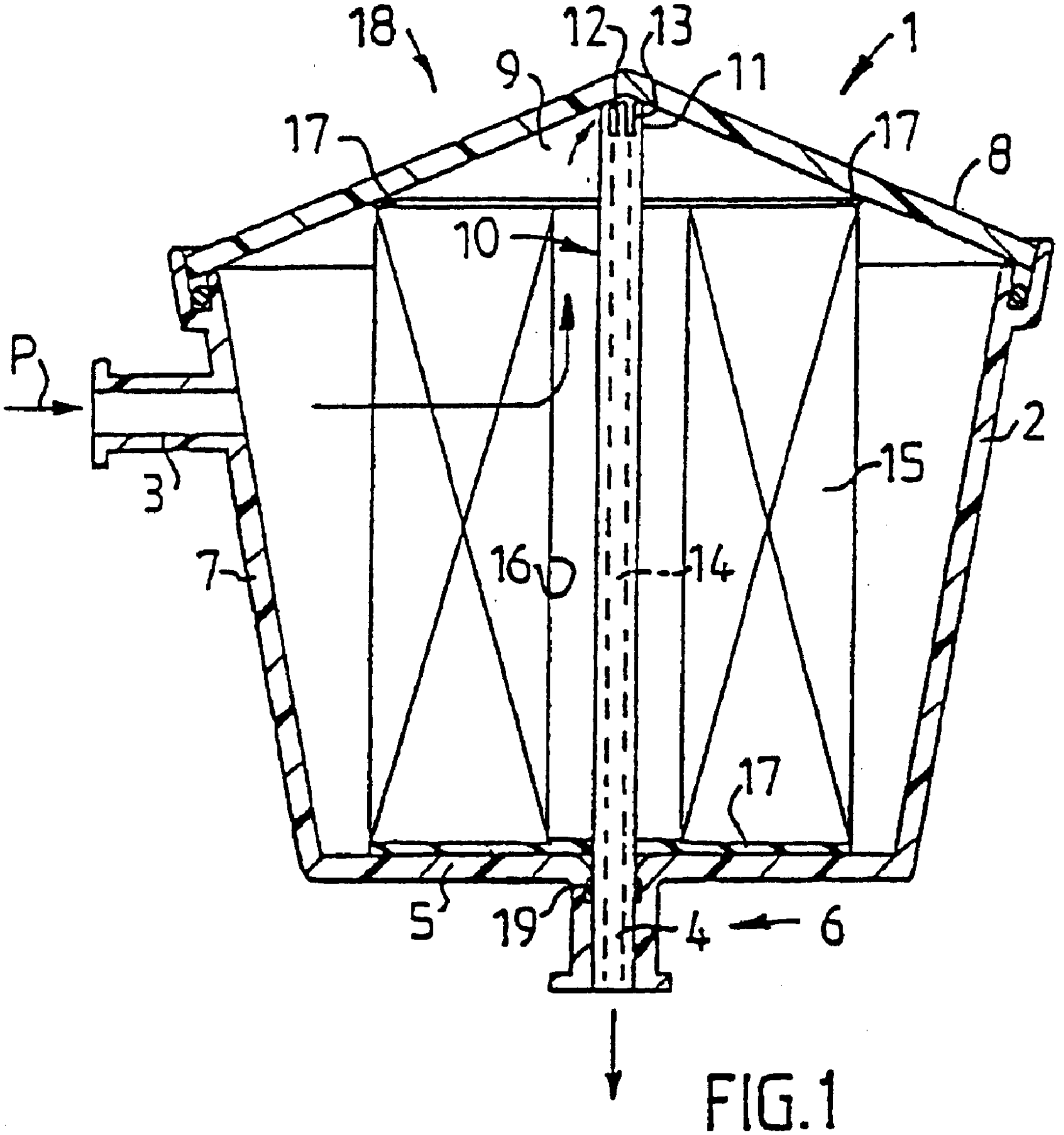

The present invention relates to a device for the continuous further transport of air in a fuel system, comprising a container with an inlet orifice and an outlet orifice for the fuel. The invention also relates to a replaceable unit for such a device.

In fuel systems of internal combustion engines air can sometimes be entrained with the fuel from the fuel tank. The air then collects to form pockets in the fuel pipes and other components of the fuel system.

It is customary to place a fuel filter in the highest part of the fuel system. The fuel filter is constructed in such a way that the air located in the fuel system is collected in the fuel filter. The fuel system can be freed from air manually at intervals, e.g. when the engine is being serviced, with the aid of an air-bleed screw, which forms part of the filter.

However, it has been found that the air collecting in the filter has a detrimental effect on the engine performance, because the air in the fuel system is compressible. There is also a problem with the manual bleeding of air, since the fuel drips onto the engine components in this operation.

One object of the present invention is therefore to provide a device for the continuous further transport of air in a fuel system in a way that does not affect the performance of internal combustion engines and prevents the spilling of fuel onto the engine components during the continuous further transport of air.

This is achieved by a device of the kind mentioned in the introduction, in which a tube placed in a container extends from the outlet orifice and opens into a collection space for air in the container.

With such a device, no air pockets are formed in the fuel system. The air that is entrained from the fuel tank is continuously conveyed further by the tube provided in the container, to be subsequently passed into the combustion chamber of the internal combustion engine. Since the further transport of air is continuous, very little air reaches the combustion chamber at any given moment, and thus it does not have a significant effect on the functioning of the internal combustion engine. Since the air-bleed screw is superfluous in the case of the device according to the invention, the spilling of fuel onto the engine can be avoided.

Another object of the present invention is to provide a replaceable unit for the device according to the invention.

To achieve this, the tube is connected with a cover for the container; the shape of the cover defines the collection space inside the container, and the filter element incorporated for liquid or gaseous fuels is connected with the tube and/or the cover.

With such a replaceable unit, the continuous further transport of air can be maintained after the filter element has been replaced.

The invention is described below in more detail with the aid of an embodiment illustrated in the attached drawing, where FIG. 1 shows a cross section of the device according to the invention.

FIG. 1 shows a cross section of the device 1 according to one embodiment of the present invention. The device comprises a container 2, which is fitted with an inlet orifice 3 and an outlet orifice 4 for the fuel. In the embodiment illustrated, the outlet orifice 4 is located at the bottom 5 of the container 2, which represents substantially the lowest part 6 of the container 2 in the vertical direction. The inlet orifice 3 is arranged on a side wall 7 of the container 2.

The container 2 comprises a cover 8, which, with its domed shape, defines a collection space 9 for the air in the container 2. This collection space 9 represents substantially the highest part of the container 2 in the vertical direction. A tube 10 arranged in the container 2 extends from the outlet orifice 4 and opens into the collection space 9 of the container 2. The part of the end 11 of the tube 10 that opens into the collection space 9 is equipped with slits 12 to form fingers 13. In this way, the end 11 of the tube 10 can abut against the part of the cover 8 that faces the inside of the container 2 and at the same time it permits the flow of the fuel into the tube 10, which will be explained later. The volume of air collecting in the container 2 can be reduced to a minimum or even to zero, owing to the construction of the slits 12 with a set length in the longitudinal direction of the tube 10. The tube 10 is provided with a through-duct 14 that extends in the longitudinal direction of the tube 10. This duct 14 has a small diameter, which increases the flow velocity of the fuel through the duct 14.

According to one embodiment of the invention, a filter element 15 can be mounted in the container 2. This filter element 15 comprises a through-opening 16, through which the tube 10 extends. The filter element 15 consists of a material that can be traversed by liquid or gaseous fuels and is equipped with sealing surfaces 17 for achieving a seal from the inside surfaces of the container 2, so as to direct the fuel through the filter element 15 during the fuel filtration process.

The filter element 15 and the cover 8 are connected together to form a replaceable unit 18 for the fuel filter. The tube 10 can also be connected with the replaceable unit 18. In this way, when the filter element 15 is to be replaced, the cover 8, the tube 10 and the filter element 15 are removed as an inter-connected replaceable unit 18, and a new cover 8, tube 10 and filter element 15 are inserted in their place. It is also possible to make only the filter element 15 as a replaceable unit, in which case only the cover 8 and the tube 10 are connected together. Flanges or stays (not shown) can be provided between the cover 8, the tube 10 and the filter element 15 to connect them with one another.

A seal 19 is provided at the outlet orifice 4 to prevent the fuel from flowing between the tube 10 and the outlet orifice 4. This seal is so arranged that the tube 10 can be moved with respect to the seal 19 when the filter element 15 is being replaced.

When the device 1 is being fitted to an internal combustion engine, a flexible fuel pipe (not shown) leading from the fuel tank is connected to the inlet orifice 3, and a flexible pipe (not shown) that leads to the space in the cylinder is connected with the outlet orifice 4. The fuel filter 1 is preferably so fitted to the internal combustion engine that the cover 8 points essentially upwards, and so the tube 10 extends substantially in the vertical direction. In this way, the fuel enters the inlet orifice 3, passes through the filter element 15 and is filtered as a result. The fuel then flows towards the highest part of the container 2, so as to enter the tube 10 there. Since the diameter of the duct 14 in the tube 10 is small, the flow velocity of the fuel is increased on entering the duct 14. The fuel finally flows out at the outlet orifice 4. The route of the fuel through the device 1 is indicated by the arrows p in FIG. 1.

If air is entrained from the fuel tank, it follows the same route through the device 1 as the fuel. There are no air pockets formed in the highest part of the container 2, i.e. in the collection space 9, because the end 11 of the tube 10 opens into this region. Since the flow velocity of the fuel increases when the fuel enters the tube 10, the conditions for air being entrained with the fuel entering the tube 10 also increase. The air is then conveyed further with the fuel until it reaches the combustion chamber of the internal combustion engine. The device 1 described here therefore ensures the continuous further transport of air in the fuel system.

What is claimed is:

1. Device for the continuous further transport of air in a fuel system, comprising a container (2) with an inlet orifice (3) and an outlet orifice (4) for the fuel, and a tube (10) provided in the container (2), which tube (10) extends from the outlet orifice (4) and opens into a collection space (9) for air in the container (2), characterized in that a filter element (15) made of a material that can be traversed by liquid or gaseous fuels is arranged in the container (2), that the container (2) comprises a cover (8), whose shape defines the collection space (9) in the container (2), and that the cover (8) is arranged to be removed from the container (2) when the filter element (15) is to be replaced.

2. Device according to claim 1, characterized in that the collection space (9) represents substantially the highest part of the container (2) in the vertical direction.

3. Device according to claim 1, characterized in that the outlet orifice (4) represents substantially the lowest part of the container (2) in the vertical direction.

4. Device according to claim 1, characterized in that the end of the tube (10) that opens into the collection space (9) of the container (2) is equipped with slits (12) to form fingers (13).

5. Device according to claim 1, characterized in that the filter element (15) comprises sealing surfaces (17) that are provided for achieving a seal from the internal surfaces of the container (2), so as to direct the fuel through the filter element (15) in the fuel filtration process.

6. Device according to claim 1, characterized in that the filter element (15) comprises a through-opening 16, through which the tube (10) extends.

7. Device according to claim 1, characterized in that the filter element (15) and the cover (8) are connected together to form a replaceable unit (18).

8. Device according to claim 7, characterized in that the tube (10) is connected with the replaceable unit (18).

9. Replaceable unit for a device according to claim 1, characterized in that the tube (10) is connected with a cover (8) that is provided for the container (2) and whose shape defines the collection space (9) in the container (2), and in that a filter element (15) for liquid or gaseous fuels is connected with the tube (10) and/or the cover (8).

* * * * *